(12) United States Patent
Wakumoto et al.

(10) Patent No.: US 10,050,841 B2
(45) Date of Patent: Aug. 14, 2018

(54) APPLYING A MULTI-INSTANCE SPANNING TREE PROTOCOL (MSTP) CONFIGURATION

(71) Applicant: HEWLETT PACKARD ENTERPRISE DEVELOPMENT LP, Houston, TX (US)

(72) Inventors: Shaun K. Wakumoto, Roseville, CA (US); Craig J. Mills, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 24 days.

(21) Appl. No.: 15/306,732

(22) PCT Filed: Apr. 25, 2014

(86) PCT No.: PCT/US2014/035525
§ 371 (c)(1),
(2) Date: Oct. 25, 2016

(87) PCT Pub. No.: WO2015/163919
PCT Pub. Date: Oct. 29, 2015

(65) Prior Publication Data
US 2017/0054604 A1 Feb. 23, 2017

(51) Int. Cl.
*H04L 12/24* (2006.01)
*H04L 12/28* (2006.01)
*H04L 12/46* (2006.01)

(52) U.S. Cl.
CPC ............. *H04L 41/12* (2013.01); *H04L 12/28* (2013.01); *H04L 12/462* (2013.01); *H04L 12/4641* (2013.01); *H04L 41/0836* (2013.01); *H04L 41/0863* (2013.01)

(58) Field of Classification Search
None
See application file for complete search history.

(56) References Cited

U.S. PATENT DOCUMENTS

| 6,937,576 | B1* | 8/2005 | Di Benedetto | ....... H04L 12/462 370/256 |
| 7,701,881 | B1 | 4/2010 | Sankaran | |
| 7,760,668 | B1* | 7/2010 | Zinjuvadia | ............ H04L 12/462 370/256 |
| 7,940,700 | B2 | 5/2011 | Dalberg | |

(Continued)

FOREIGN PATENT DOCUMENTS

WO    WO-2014/051593 A1    4/2014

OTHER PUBLICATIONS

"OmniSwitch AOS Release 7 Network Configuration Guide," Dec. 2012, pp. 1-884, Alcatel-Lucent.

(Continued)

*Primary Examiner* — Brian Roberts
(74) *Attorney, Agent, or Firm* — Hewlett Packard Enterprise Patent Department (57) ABSTRACT

Applying an MSTP configuration can include instructing a plurality of network devices to disable non-MSTP links in response to a verification of receipt of the MSTP configuration and instructing the plurality of network devices to apply the MSTP configuration in response to a verification that each of the plurality of network devices disabled the non-MSTP links.

15 Claims, 4 Drawing Sheets

(56) References Cited

U.S. PATENT DOCUMENTS

| | | | |
|---|---|---|---|
| 8,089,882 B2 | 1/2012 | Guntur et al. | |
| 2006/0182133 A1* | 8/2006 | Choumaru | H04L 12/4641 370/401 |
| 2007/0140147 A1 | 6/2007 | Touve et al. | |
| 2007/0242602 A1 | 10/2007 | Pang et al. | |
| 2008/0089245 A1* | 4/2008 | Reichstein | H04L 12/462 370/256 |
| 2008/0165704 A1* | 7/2008 | Marchetti | H04L 12/4641 370/256 |
| 2008/0181138 A1 | 7/2008 | Dalberg | |
| 2014/0010091 A1 | 1/2014 | North et al. | |

OTHER PUBLICATIONS

International Search Report and Written Opinion, International Application No. PCT/US2014/035525, dated Jan. 19, 2015, pp. 1-8, KIPO.

\* cited by examiner

APPLYING A MULTI-INSTANCE SPANNING TREE PROTOCOL (MSTP) CONFIGURATION

BACKGROUND

Entities can maintain networks with one or more connections to the Internet and/or an intranet. Networks can include a plurality of resources connected by communication links, and can be used to connect people, provide services—both internally and externally via the Internet and/or intranet—and/or organize information, among other activities associated with an entity. An example network can include a software-defined network (SDN).

DETAILED DESCRIPTION

A Spanning Tree Protocol (STP) is a network protocol that helps prevent loops from being formed when network devices are interconnected via multiple paths in a network. Multiple active paths between network devices can cause loops in the network, resulting in the potential for duplication of messages. The spanning tree can force certain redundant data paths into a standby (e.g., blocked) state. A standby/block state can include link blocking. A blocked link can include a port that is functionally available but operationally disabled (e.g., traffic cannot be sent from the port and any traffic received at the port can be dropped). A Multi-instance Spanning Tree Protocol (MSTP) can include a protocol that configures a separate spanning tree for each virtual local area network (VLAN) in a network that spans across the network devices. Traffic belonging to different VLANs can flow over potentially different paths. If one network segment in the MSTP becomes unreachable, or if the MSTP cost changes, the MSTP can be reconfigured.

MSTPs, however, can be difficult to configure, maintain, and troubleshoot. According to some previous approaches, an MSTP can be configured by manually configuring each network device, using an application to systematically update the MSTP configuration from the farthest network device to the nearest, or pushing the MSTP configuration to all network devices and setting the same time-based "apply" timer to each device. Manual configuration is a tedious task and can be prone to error. Configuring each network device from the farthest to the nearest can result in network disruption as the configuration of each network device can cause temporary MSTP instability. Further, pushing the MSTP configuration to all network devices can reduce disruption but can be problematic if one of the MSTP configurations is incorrect and/or if a user gets locked out of a network device (e.g., lack of login credentials) and/or if there is not path to the network device and is not local to the network. For example, if a user is locked out of a network device, the user may need to physically access a network terminal to configure the device (which may be difficult if the user is not local to the network).

In contrast, examples of the present disclosure can configure an MSTP for a network without and/or with minimal user input. A network device in the MSTP region of the network can be assigned as a master reconfiguration network device (MRD). An MSTP region, as used herein, can include a collection of network devices that are participating in an MSTP. The MRD and/or a component external to the MSTP region, such as a controller of a software-defined network (SDN), can collect network data and build an MSTP configuration using the network data. A MSTP configuration, as used herein, can be a MSTP configured for a network. An MSTP configuration can be sent to each network device using the MRD. Building the MSTP configuration using a controller can be advantageous because of the removal of the computational task from the data plane of the network to a control plane which may have more available resources then the data plane (e.g., the network devices).

The MRD can verify that each network device receives the MSTP configuration via an acknowledgement message from each of the network devices. In response to verifying the network devices received the MSTP configuration, the MRD can instruct the network devices to disable non-MSTP links and, in response to verification that non-MSTP links are disabled, can instruct the network devices to apply the MSTP configuration. The MRD can verify that each network device applied the MSTP configuration and that the MSTP configuration is stable. If the MRD cannot verify that one of the network devices received the MSTP configuration and/or disabled non-MSTP links, the MRD and/or the controller can build a revised MSTP configuration. Further, if the MRD cannot verify that each network device applied the configuration and/or that the MSTP configuration is stable, the MRD can instruct the network devices to revert back to a prior MSTP configuration. The reversion mechanism can, for example, prevent and/or avoid network failure. Further, the MRD validating and/or ensuring the MSTP configuration is applied and is stable can increase resiliency of the configuration process. Additional examples, advantages, features, modifications and the like are described below with reference to the drawings.

Figure 1:
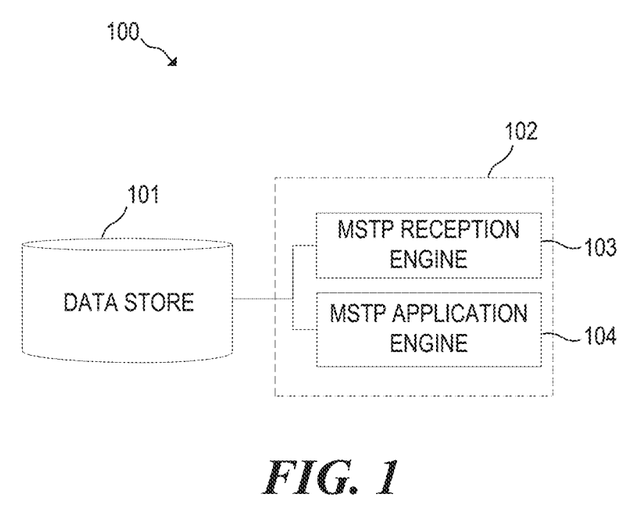
FIG. 1 illustrates an example of a system according to the present disclosure.

FIG. 1 illustrates an example of a system 100 according to the present disclosure. The system 100 can be utilized to apply an MSTP configuration according to the present disclosure. The system 100 can include a data store 101, an MSTP configuration system 102, and/or a number of engines (e.g., MSTP reception engine 103 and MSTP application engine 104). The MSTP configuration system 102 can be in communication with the data store 101 via a communication link, and can include the number of engines. In some examples, the system 100 can be executed by an MRD, as discussed herein. The MSTP configuration system 102 can include additional or fewer engines than illustrated to perform the various functions described herein.

The MSTP reception engine 103 and the MSTP application engine 104 can include a combination of hardware and programming that is configured to perform a number of functions described herein (e.g., instruct network devices to apply an MSTP configuration). The programming can include program instructions (e.g., software, firmware, etc.) stored in a memory resource (e.g., computer readable medium, machine readable medium, etc.) as well as hardwired program (e.g., logic). As used herein, an "engine" can include software and/or hardware, but at least includes hardware.

The MSTP reception engine 103 can include hardware and/or a combination of hardware and programming to verify that each of a plurality of network devices receives an MSTP configuration. The verification can include verifying that each of the plurality of network devices receive the MSTP configuration via an acknowledgement message (ACK) from each of the plurality of network devices. Network devices, as used herein, can include switches, routers, hubs, and/or bridges, among other devices. The MSTP configuration can be sent to each of the plurality of network devices, in various examples, by one of the plurality of network devices that is assigned as a MRD, as discussed further herein. In response to receiving the MSTP configuration, each network device can send an ACK to the MRD to acknowledge reception of the MSTP configuration.

The MSTP reception engine 103 can instruct the plurality of network devices to disable non-MSTP links in response to verification of receipt of the MSTP configuration. Non-MSTP links can include communication links (e.g., ports) of the plurality of network devices that are not related to and/or involved in the MSTP configuration process. Disabling non-MSTP links during an MSTP configuration process can, for instance, disrupt traffic to the MSTP region. For instance, disabling non-MSTP links can disrupt communication of the MSTP region from the rest of the network. However, the disruption of traffic (e.g., communication that is not related to MSTP configuration) can increase network stability by preventing looping of traffic during the MSTP configuration process and the disruption can include a limited period of time (e.g., a short time frame).

An MSTP region, as used herein, can include a collection of network devices that are participating in an MSTP. In a number of examples, a network can include multiple MSTP regions and a particular MSTP region can include a subset of network devices of the network. Different MSTP regions can be connected by a network device, for example.

The MSTP application engine 104 can include hardware and/or a combination of hardware and programming to instruct the plurality of network devices to apply the MSTP configuration in response to a verification that each of the plurality of network devices disabled the non-MSTP links and/or that the MSTP configuration applied is stable (as discussed further herein). The verification can include verifying that each of the plurality of network devices disabled non-MSTP links via an ACK from each of the plurality of network devices. For example, in response to receiving the instruction from the MSTP reception engine 103 to disable non-MSTP links, each network device can send an ACK to the MSTP reception engine 103 and/or the MSTP application engine 104. In a number of examples, the instruction can include an instruction to the network devices to back-up their current MSTP configuration (e.g., a previous configuration) and apply the MSTP configuration (e.g., a new/revised configuration).

The MSTP reception engine 103 and the MSTP application engine 104 can be executed by one of the plurality of network devices that is assigned as the MRD. The MRD can be assigned, for instance, randomly and/or based on a property of the network device. For example, a property can include a number of communication links to other devices and/or available resources, among other properties. As an example, an MRD can be assigned based on which network device among the plurality of network devices has a direct communication and/or shortest path of communication to the largest number of network devices. If more than one network device has a direct communication and/or shortest path of communication to the largest number of devices (e.g., two network devices have a direct communication and/or shortest path of communication to all of the network devices), the network device assigned as the MRD can be random among the more than one network device and/or based on another property of the network devices (e.g., assign to the device with the most available resources, such as storage, processing, and/or other resources).

In various examples, the MSTP application engine 104 can verify that each of the plurality of network devices applied the MSTP configuration. For instance, verification can include verifying via an ACK from each of the plurality of network devices. For example, in response to receiving the instruction from the MSTP configuration system 102 to apply the MSTP configurations and appropriately applying the MSTP configuration, each network device can send an ACK to the MSTP configuration system 102 (e.g., the MRD). In a number of examples, the MSTP application engine 104 can verify that the MSTP configuration is stable. An MSTP configuration that is stable can include an MSTP that does not create loops and/or disrupt traffic in the network and/or an MSTP region that is not undergoing topology changes. An MSTP configuration may become unstable, for instance, in response to changes to the topology of the network, and/or root elections, among other reasons.

In a number of examples, the MSTP application engine 104 can instruct the plurality of network devices to re-enable non-MSTP links in response to a verification that each of the plurality of network devices applied the MSTP configuration and/or verification that the MSTP configuration is stable. Alternatively, the MSTP application engine 104 can instruct the plurality of network device to revert to a previous MSTP configuration in response to the MSTP configuration being unstable (as discussed further herein).

In various examples, the MSTP configuration system 102 can include an MSTP configuration engine (not specifically illustrated in FIG. 1). The MSTP configuration engine can include hardware and/or a combination of hardware and programming to collect network data from the plurality of network devices and build the MSTP configuration using the collected network data. The network data can include, for instance, topology information of the plurality of network devices, per-port counters, and/or per-VLAN counters, among other data. The topology information can include and/or result in a map of all network devices and their interconnections to each other within the MSTP region. The network data can be periodically collected from the network devices over a period of time (e.g., hours, days, weeks, etc.)

The MSTP configuration that is built can, for example, be a non-proprietary solution. A user (e.g., an administrator, and/or other personnel associated with the network) can view the MSTP configuration and understand the deterministic paths through the network devices allowing the user to back-up, revise, and/or analyze the MSTP configuration more easily than a proprietary solution. For instance, upon viewing the MSTP configuration that is a non-proprietary solution, the user can understand the deterministic path and/or blocked links through the network devices. The user can, based on their knowledge of the network, revise the MSTP configuration. As an example, a particular blocked link may be known to be more secure than a particular non-blocked link. The user can revise the particular blocked link to be non-blocked and the particular non-blocked link to be blocked. With a proprietary solution, a user may not be able to determine that the secure link is blocked.

The MSTP configuration engine can, for instance, be executed by a controller of an SDN or, alternatively, the MRD. Executing the MSTP configuration engine by a controller of the SDN can be advantageous by separating the processing for the MSTP from the data plane of the network (e.g., the network devices) to the control plane (e.g., the controller). A controller of an SDN, for instance, can include a topology discovery function and can use the topology information (discovered using the function) to build the MSTP configuration. Further, the controller may have additional available resources that can be used to build the MSTP configuration.

However, in some examples, a controller of an SDN may not be connected to each network device of an MSTP region. For instance, the controller may be connected to one network device in the MSTP region. Thereby, utilizing the MRD to validate and/or ensure the MSTP configuration is applied and is stable, in addition to utilizing the controller to build the MSTP configuration, can increase resiliency of the MSTP configuration process as compared to prior solutions.

Figure 2:
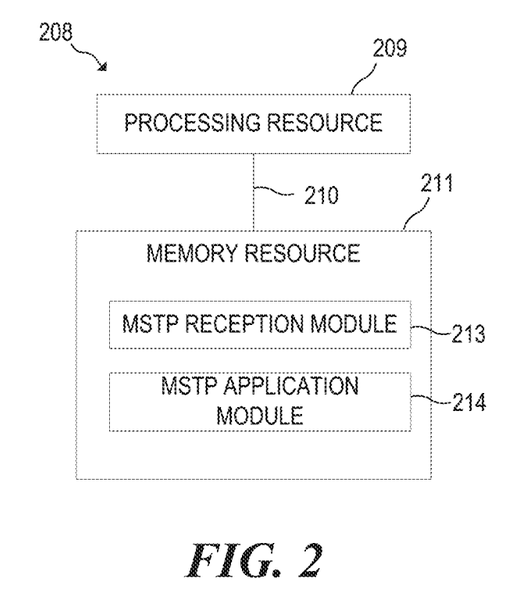
FIG. 2 illustrates an example of a computing device according to the present disclosure.

FIG. 2 illustrates a diagram of an example computing device 208 according to the present disclosure. The computing device 208 can utilize software, hardware, firmware, and/or logic to perform a number of functions described herein.

The computing device 208 can be any combination of hardware and program instructions configured to share information. The hardware, for example can include a processing resource 209 and/or a memory resource 211 (e.g., computer-readable medium (CRM), machine readable medium (MRM), database, etc.). A processing resource 209, as used herein, can include any number of processors capable of executing instructions stored by a memory resource 211. Processing resource 209 may be integrated in a single device or distributed across multiple devices. The program instructions (e.g., computer-readable instructions (CRI)) can include instructions stored on the memory resource 211 and executable by the processing resource 209 to implement a desired function (e.g., instruct a plurality of network devices to apply an MSTP configuration).

The memory resource 211 can be in communication with a processing resource 209. A memory resource 211, as used herein, can include any number of memory components capable of storing instructions that can be executed by processing resource 209. Such memory resource 211 can be a non-transitory CRM or MRM. Memory resource 211 may be integrated in a single device or distributed across multiple devices. Further, memory resource 211 may be fully or partially integrated in the same device as processing resource 209 or it may be separate but accessible to that device and processing resource 209. Thus, it is noted that the computing device 208 may be implemented on a participant device, on a server device, on a collection of server devices, and/or a combination of the user device and the server device.

The memory resource 211 can be in communication with the processing resource 209 via a communication link (e.g., a path) 210. The communication link 210 can be local or remote to a machine (e.g., a computing device) associated with the processing resource 209. Examples of a local communication link 210 can include an electronic bus internal to a machine (e.g., a computing device) where the memory resource 211 is one of volatile, non-volatile, fixed, and/or removable storage medium in communication with the processing resource 209 via the electronic bus.

A number of modules (e.g., MSTP reception module 213 and MSTP application module 214) can include CRI that when executed by the processing resource 209 can perform a number of functions. The number of modules can be sub-modules of other modules. For example, the MSTP reception module 213 and the MSTP application module 214 can be sub-modules and/or contained within the same computing device. In another example, the number of modules can comprise individual modules at separate and distinct locations (e.g., CRM, etc.). As used herein, a "module" can include software and/or hardware, but at least includes software.

Each of the number of modules can include instructions that when executed by the processing resource 209 can function as a corresponding engine as described herein. For example, the MSTP reception module 213 can include instructions that when executed by the processing resource 209 can function as the MSTP reception engine 103. In another example, the MSTP application module 214 can include instructions that when executed by the processing resource 209 can function as the MSTP application engine 104.

Figure 3:
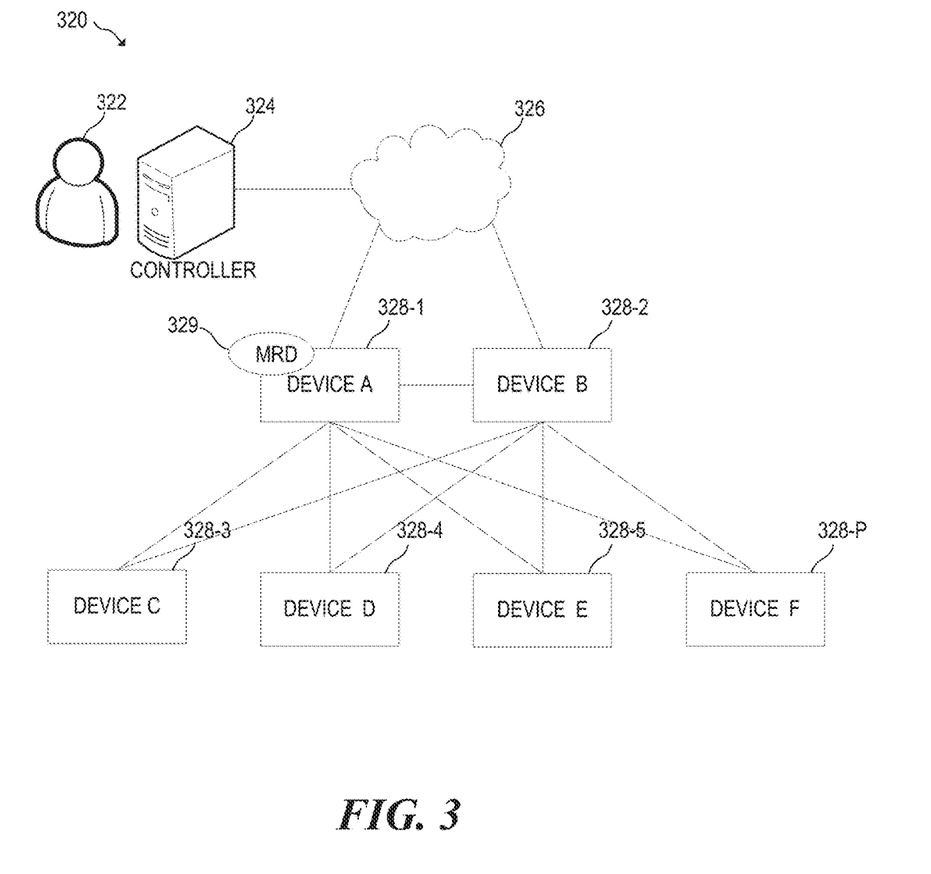
FIG. 3 is a diagram of an example of an environment for applying an MSTP configuration according to the present disclosure.

FIG. 3 is a diagram of an example of an environment 320 for applying an MSTP configuration according to the present disclosure. The environment, as illustrated by FIG. 3, can include a controller 324.

The controller 324 can be an SDN network controller (e.g., as discussed further herein). SDN is a form of network virtualization in which the control plane is separated from the data plane and implemented in a software application. Network administrators (e.g., user 322) can therefore have programmable centralized control of network traffic without requiring physical access to the network's hardware devices. In some examples, the controller 324 can be a discrete device, such as a server. In some examples, the network controller 324 can be a distributed network controller, for example, such as a cloud-provided functionality (e.g., network cloud 326). One example of a protocol for SDN is OpenFlow, which is a communication protocol that gives access to the forwarding plane of a network switch over the network. Some examples of the present disclosure can operate according to an OpenFlow, or other SDN protocol, and/or a hybrid of an SDN protocol combined with "normal" (e.g., distributed control plane) networking. The controller functionality, as discussed herein, can be embedded in the controller 324 and/or can be implemented by other computing devices that interface with the controller 324, in various examples.

The controller 324 can be in communication with and/or have control over network devices 328-1, 328-2, 328-3, 328-4, 328-5 . . . 328-P. For example, network devices 328-1 . . . 328-P can be switches, routers, hubs, and/or bridges, among other devices. Examples are not limited to the specific number of network devices 328-1 . . . 328-P illustrated in the network.

The controller 324 and the network devices 328-1 . . . 328-P can be in communication using a communication protocol. For instance, the communication protocol can include a communication link between the controller 324 and the network devices 328-1 . . . 328-P using a secure channel. The communication protocol, in various examples, can include an OpenFlow protocol, OpenFlow-configuration protocol, Simple Network Management protocol (SNMP), and/or Network Configuration Protocol (NetConf). As an example, the controller 324 can use the communication protocol to manage the network devices 328-1 . . . 328-P.

A user 322 (e.g., an administrator and/or other person associated with the environment 320) can configure each of the plurality of network devices 328-1 . . . 328-P for auto-MSTP configuration. In response to the configuration, as illustrated by FIG. 3, one of the plurality of network devices 328-1 . . . 328-P can be assigned as an MRD 329. The assignment can be random and/or based on a property of the particular network device (e.g., Device A 328-1). For instance, the network device assigned as the MRD 329 can have a direct communication link to the remaining network devices 328-2 . . . 328-P.

In accordance with various examples of the present disclosure, the controller 324 can collect network data from the plurality of network devices 328-1 . . . 328-P and use the network data to build an MSTP configuration. Alternatively, as discussed further herein with regards to the example illustrated in FIG. 4, the MRD 329 can collect network data and build the MSTP configuration. The MSTP configuration can, for instance, optimize the use of the MSTP links. The configuration may result in new MSTP VLAN instances, changing VLAN memberships within the MSTP VLAN instances, new MSTP instance root elections, and/or new link blocking. The MSTP can include several STP instances running in an overlay fashion on a set of network devices and each STP instance can comprise a set of VLANs. The VLAN membership within an MSTP instance can be altered in order to get different forwarding states for ports. The MSTP configuration can result in a more balanced MSTP topology that utilizes bandwidth better than the prior MSTP configuration and without the assistance of the user 322.

Further, when a controller 324 builds the MSTP configuration, a variety of sets of attributes can be chosen to drive the selection of links used or blocked by the MSTP configuration. Attributes, as used herein, can be a characteristic of links selected to be used or blocked. Example attributes can include the physical media, such as copper or fiber, or a preference to limit the traffic through a particular network device. The attributes can be incorporated into a function (e.g., algorithm) by the controller 324 to build the MSTP configuration.

In some examples, the MSTP configuration can be provided to a user 322 by the controller 324 (and/or the MRD 329, in some examples). For example, providing the MSTP configuration to a user 322, as used herein, can include providing an interface to the user 322 to view, edit, and/or approve the MSTP configuration. The MSTP configuration can be revised by the controller 324 (and/or the MRD 329) in response to user input. For instance, the user 322 can change a different root device based on high availability capabilities and/or not block links that may be deemed "more" secure than other links.

The controller 324, for example, can send the MSTP configuration to the plurality of network devices 328-1 . . . 328-P. In many instances, however, the controller 324 may have limited direct communication links to the network devices 328-1 . . . 328-P (e.g., is directly linked to a sub-set of the devices 328-1 . . . 328-P). Thereby, in some examples, the controller 324 can send the MSTP configuration to the MRD 329 and the MRD 329 can send the MSTP configuration to the remaining plurality of network devices 328-2 . . . 328-P. The MRD 329 sending the MSTP configuration to each network device 328-1 . . . 328-P can ensure the network devices 328-1 . . . 328-P receive the MSTP configuration and allow the network devices 328-1 . . . 328-P to send an acknowledgement of reception to the MRD 329.

The MRD 329 can instruct the plurality of network devices 328-1 . . . 328-P to perform a number of MSTP functions. For example, the MRD 329 can instruct the plurality of network devices 328-1 . . . 328-P to disable non-MSTP links in response to verification that each of the plurality of network devices 3 28-1 . . . 328-P receive the MSTP configuration, apply the MSTP configuration in response to verification that each of the plurality of network devices 328-1 . . . 328-P disabled the non-MSTP links, and re-enable the non-MSTP links in response to verification that each of the plurality network devices 328-1 . . . 328-P applied the MSTP configuration and/or that the MSTP configuration is stable. The MRD 329 can verify that the MSTP configuration is stable, for example, prior to instructing the plurality of network devices 328-1 . . . 328-P to re-enable non-MSTP links.

In response to sending the MSTP configuration to the plurality of network devices 328-1 . . . 328-P, the MRD 329 can receive an acknowledgement from each of the plurality of network devices 328-1 . . . 328-P. The acknowledgement can, for instance, include an ACK. The MRD 329 can verify that each of the plurality of network devices 328-1 . . . 328-P receive the MSTP configuration via an ACK from each of the plurality of network devices 328-1 . . . 328-P. If an ACK is not received from at least one of the plurality of network devices 328-1 . . . 328-P, a revised MSTP configuration can be built by the controller 324, as discussed further herein. Not receiving an ACK, as used herein, can include receiving a negative acknowledgement message (NACK) and/or no message from a network device.

In response to receiving an acknowledgment from each of the plurality of network devices 328-1 . . . 328-P that the MSTP configuration is received (e.g., an ACK), the MRD 329 can instruct the plurality of network devices 328-1 . . . 328-P to disable non-MSTP links. The MRD 329 can receive an acknowledgement from each of the plurality of network devices 328-1 . . . 328-P in response to the instructions to disable non-MSTP links. The acknowledgement can include an ACK. For example, the MRD 329 can verify that each of the plurality of network devices 328-1 . . . 328-P disabled non-MSTP links via an ACK from each of the plurality of network devices 328-1 . . . 328-P. If an ACK is not received from at least one of the plurality of network devices 328-1 . . . 328-P, a revised MSTP configuration can be built by the controller 324, as further discussed herein.

In response to receiving an acknowledgement from each of the plurality of network devices 328-1 . . . 328-P that non-MSTP links are disabled (e.g., an ACK), the MRD 329 can instruct the plurality of network devices 328-1 . . . 328-P to apply the MSTP configuration. The instruction to apply, as used herein, can include an instruction to the network devices 328-1 . . . 328-P to back-up their current MSTP configuration (e.g., a previous configuration) and apply the MSTP configuration (e.g., a new/revised configuration). The MRD 329 can receive an acknowledgement from each of the plurality of network devices 328-1 . . . 328-P in response to the instruction to apply the MSTP configuration. The acknowledgement can include an ACK. For instance, the MRD 329 can verify that each of the plurality of network devices 328-1 . . . 328-P applied the MSTP configuration via an ACK from each of the plurality of network devices 328-1 . . . 328-P.

If an ACK is not received from at least one of the plurality of network devices 328-1 . . . 328-P and/or if the MSTP configuration is not stable, the MRD 329 can instruct each of the plurality of network devices 328-1 . . . 328-P to revert to a previous MSTP configuration. The verification of a stable MSTP configuration can be based on criteria, such as no topology changes and/or no root election changes, among other criteria. The previous MSTP configuration can include a stable MSTP configuration. That is, the previous MSTP configuration can include a last known, stable MSTP configuration. In response to the instruction, each of the network devices 328-1 . . . 328-P can apply their previous MSTP configuration. Further, a revised MSTP configuration can be built by the controller 324, as further discussed herein.

In response to receiving an acknowledgement from each of the plurality of network devices 328-1 . . . 328-P that the MSTP configuration is applied (e.g., an ACK) and/or verifying the MSTP configuration is stable, the MRD 329 can instruct the plurality of network devices 328-1 . . . 328-P to re-enable the non-MSTP links. The instruction can include, for instance, a resume command. The resume command can instruct each of the network devices 328-1 . . . 328-P to re-enable the non-MSTP links (e.g., to resume network traffic using the MSTP configuration). Upon issuing the resume command, the MRD 329 can be unassigned as the MRD. That is, the assigned MRD 329 can be a temporary MRD, not a dedicated MRD.

As used herein, building a revised MSTP configuration can include the controller 324 (and/or MRD 329) recollecting network data (e.g., topology information, per-port counters, and per-VLAN counters) over a period of time. The controller 324 (and/or MRD 329) can build the revised (e.g., new) MSTP configuration that can be applied to the network devices 328-1 . . . 328-P using the described process. In a number of examples, as discussed further herein, a revised MSTP configuration can be built and applied periodically.

Figure 4:
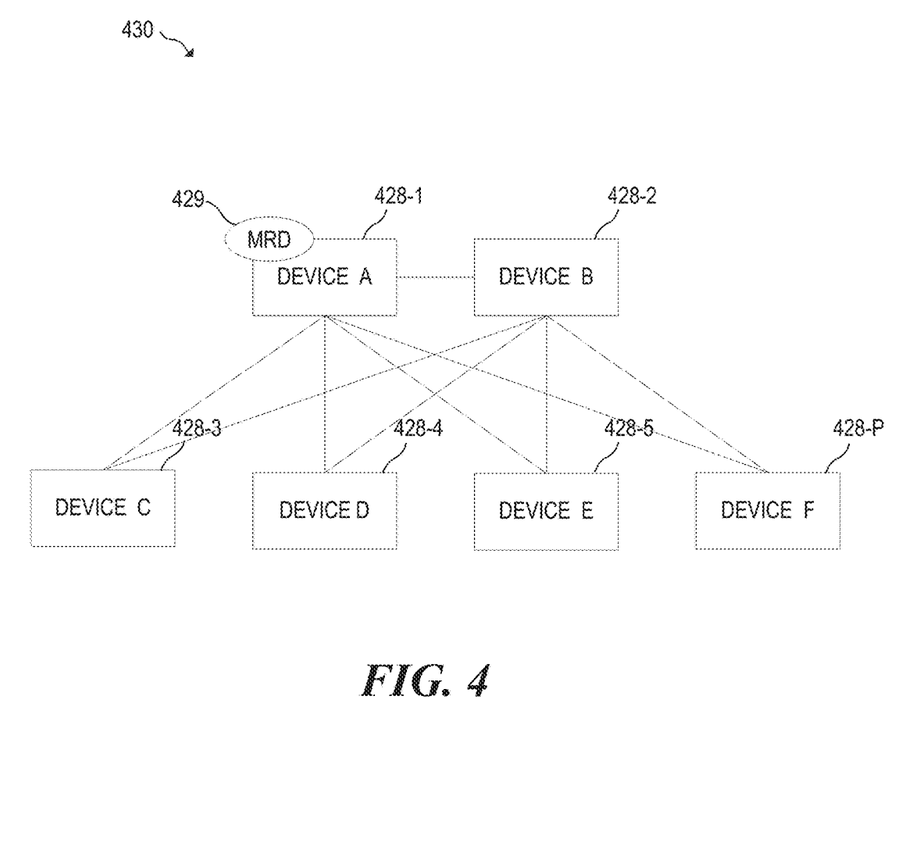
FIG. 4 is a diagram of an example of an environment for applying an MSTP configuration according to the present disclosure.

FIG. 4 is a diagram of an example of an environment 430 for applying an MSTP configuration according to the present disclosure. The environment 430 illustrated by FIG. 4 can include the same environment or a different environment from the environment 320 illustrated in FIG. 3, in a number of examples of the present disclosure.

As illustrated by FIG. 4, in some examples, the environment 430 may not include a controller of an SDN and/or the controller of the SDN may not participate in the MSTP configuration process. For instance, the environment 430 may or may not include an SDN with a controller and an MRD 429 of the environment 430 may build the MSTP configuration using network data collected from a plurality of network devices 428-1 . . . 428-P.

Similarly to the example illustrated in FIG. 3, a user can configure each of the plurality of network devices 428-1 . . . 428-P for auto-MSTP configuration. In response to the configuration, one of the plurality of network devices 428-1 . . . 428-P can be assigned as an MRD 429. The MRD 429 can collect network data from the plurality of network devices 428-1 . . . 428-P and use the network data to build an MSTP configuration. The MRD 429 can send the MSTP configuration to the plurality of network devices 428-1 . . . 428-P.

The MRD 429 can instruct the plurality of network devices 428-1 . . . 428-P to perform a number of MSTP functions. For example, the MRD 429 can instruct the plurality of network devices 428-1 . . . 428-P to disable non-MSTP links in response to verification that each of the plurality of network devices 428-1 . . . 428-P receive the MSTP configuration, apply the MSTP configuration in response to verification that each of the plurality of network devices 428-1 . . . 428-P disabled the non-MSTP links, and re-enable the non-MSTP links in response to verification that each of the plurality of network devices 428-1 . . . 428-P applied the MSTP configuration and/or that the MSTP configuration is stable.

For example, in response to sending the MSTP configuration to the plurality of network devices 428-1 . . . 428-P, the MRD 429 can receive an acknowledgement from each of the plurality of network devices 428-1 . . . 428-P (e.g., an ACK). If an ACK is not received from at least one of the plurality of network devices 428-1 . . . 428-P, a revised MSTP configuration can be built by the MRD 429.

In response to receiving an acknowledgment from each of the plurality of network devices 428-1 . . . 428-P that the MSTP configuration is received (e.g., an ACK), the MRD 429 can instruct the plurality of network devices 428-1 . . . 428-P to disable non-MSTP links. The MRD 429 can receive an acknowledgement from each of the plurality of network devices 428-1 . . . 428-P in response to the instructions to disable non-MSTP links (e.g., an ACK). If an ACK is not received from at least one of the plurality of network devices 428-1 . . . 428-P, a revised MSTP configuration can be built by the MRD 429.

In response to receiving an acknowledgement from each of the plurality of network devices 428-1 . . . 428-P that non-MSTP links are disabled (e.g., an ACK), the MRD 429 can instruct the plurality of network devices 428-1 . . . 428-P to apply the MSTP configuration. The MRD 429 can receive an acknowledgement from each of the plurality of network devices 428-1 . . . 428-P in response to the instruction to apply the MSTP configuration (e.g., an ACK). Further, the MRD 429 can verify that the MSTP configuration is stable.

If an ACK is not received from at least one of the plurality of network devices 428-1 . . . 428-P and/or if the MSTP configuration is not stable, the MRD 429 can instruct each of the plurality of network devices 428-1 . . . 428-P to revert to a previous MSTP configuration. In response to the instruction, each of the plurality of network devices 428-1 . . . 428-P can apply their previous MSTP configuration. Further, a revised MSTP configuration can be built by the MRD 429. In response to receiving an acknowledgement from each of the plurality of network devices 428-1 . . . 428-P that the MSTP configuration is applied (e.g., an ACK) and/or in response to verifying the MSTP configuration is stable, the MRD 429 can instruct the plurality of network devices 428-1 . . . 428-P to re-enable the non-MSTP links.

In some examples, an MSTP configuration can be built periodically by the MRD 429 (or the controller). For instance, at predetermined periods of time, a network device can be assigned as an MRD and a revised MSTP configuration can be built by the MRD 429. The revised MSTP configuration can be sent to the plurality of network devices 428-1 . . . 428-P and can be applied to the network devices 428-1 . . . 428-P using the above described process.

The MRD 429 validating the MSTP configuration is applied and/or is stable, in addition with the network contained reversion mechanism, can increase resiliency of the MSTP configuration process. Further, the MRD 429 disabling and verifying disabled non-MSTP links can be less disruptive and more resilient than prior solutions.

Figure 5:
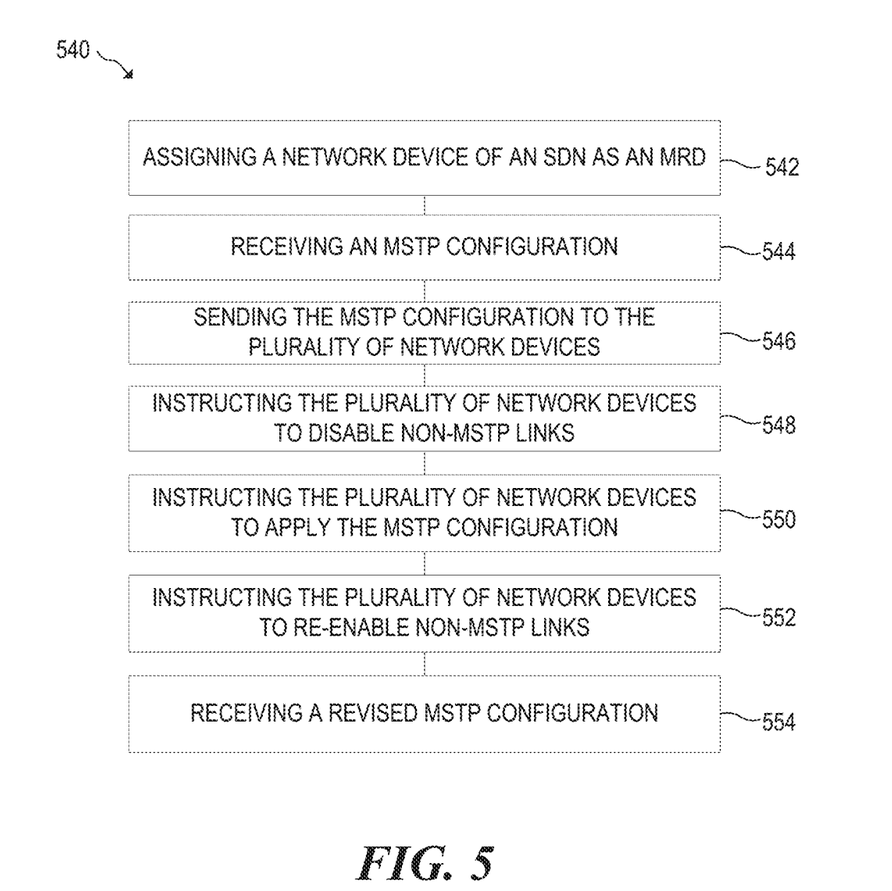
FIG. 5 illustrates a flow chart of an example of a method for applying an MSTP configuration according to the present disclosure.

FIG. 5 illustrates a flow chart of an example of a method 540 for applying an MSTP configuration according to the present disclosure. At 542, the method 540 can include assigning a network device among a plurality of network devices of an SDN as an MRD.

At 544, the method 540 can include receiving, from a controller of the SDN, an MSTP configuration by the MRD. The controller can, for instance, collect network data over a period of time and build the MSTP configuration using the network data. At 546, the method 540 can include sending the MSTP configuration to the plurality of network devices. For example, the controller can send the MSTP configuration to the plurality of network devices or the controller can send the MSTP configuration to the MRD and the MRD can send the MSTP configuration to the remaining plurality of network devices.

The MRD can instruct the plurality of network devices to perform a number of MSTP functions. For instance, at 548, the method 540 can include the MRD instructing the plurality of devices to disable non-MSTP links in response to verification that each of the plurality of network devices receive the MSTP configuration. At 550, the method 540 can include the MRD instructing the plurality of network devices to apply the MSTP configuration in response to verification that each of the plurality of network devices disabled the non-MSTP links. And, at 552, the method 540 can include the MRD instructing the plurality of network devices to re-enable the non-MSTP links in response to verification that each of the plurality of network devices applied the MSTP configuration and that the MSTP configuration is stable.

In some examples, the MRD can instruct the plurality of network devices to revert to a previous MSTP configuration in response to the MRD not receiving an acknowledgement from at least one of the plurality of network devices of receipt of the MSTP configuration, disabled non-MSTP links, application of the MSTP configuration and/or in response to the MSTP configuration being unstable. The MRD can, for instance, verify that the MSTP configuration is stable. If the MSTP configuration is unstable (e.g., based on verification by the MRD) and/or if an acknowledgement is not received from one of the network devices, the MRD can send the revert instruction. The previous MSTP configuration can be a stable MSTP. In response to the instruction to revert, the network devices can apply their previous MSTP configuration, a new MSTP configuration can be built, and/or the method 540 can be repeated.

At 554, the method 540 can include receiving, from the controller, a revised MSTP configuration by the MRD. The revised MSTP configuration can be received at a predefined period of time. For example, an MSTP configuration can be built at predefined periods of time. That is, the method 540 can be repeated at predefined periods of time. In such examples, a network device can be assigned as an MRD and a revised MSTP configuration can be received from the controller by the MRD. The assigned MRD can, in various examples, include a different network device than the network device that was previously assigned as the MRD. The controller can build the revised MSTP configuration using network data collected over a period of time. The revised MSTP configuration can be sent to the plurality of network devices and can be applied to the network devices using the method 540.

In the preceding detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process and/or structural changes may be made without departing from the scope of the present disclosure.

The figures herein follow a numbering convention in which the first digit or digits correspond to the drawing figure number and the remaining digits identify an element or component in the drawing. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense. As used herein, "a number of" an element and/or feature can refer to one or more of such elements and/or features.

What is claimed:

1. A system for applying a multi-instance spanning tree protocol (MSTP) configuration, comprising:
   a controller to:
   verify that each of a plurality of network devices receives an MSTP configuration;
   instruct the plurality of network devices to disable non-MSTP links in response to the verification of receipt of the MSTP configuration; and
   instruct the plurality of network devices to apply the MSTP configuration in response to a verification that each of the plurality of network devices disabled the non-MSTP links.

2. The system of claim 1, including the controller to verify that each of the plurality of network devices received the MSTP configuration via an acknowledgement message from each of the plurality of network devices.

3. The system of claim 1, including the controller to verify that each of the plurality of network devices:
   disabled non-MSTP links via an acknowledgement message from each of the plurality of network devices; and
   applied the MSTP configuration via an acknowledgement message from each of the plurality of network devices.

4. The system of claim 1, including the controller to instruct the plurality of network devices to revert to a previous MSTP configuration in response to the MSTP configuration being unstable.

5. The system of claim 1, including the controller to:
   collect topology information of the plurality of network devices, per-port counters, and per-virtual local area network (VLAN) counters; and
   build the MSTP configuration using the topology information, per-port counters, and per-VLAN counters.

6. The system of claim 5, wherein the controller is a software-defined network controller.

7. The system of claim 5, wherein the controller is executed by one of the plurality of network devices assigned as a master reconfiguration network device.

8. A non-transitory computer-readable medium storing instructions executable by a processing resource to cause a computer to:
   build a multi-instance spanning tree protocol (MSTP) configuration using network data collected from a plurality of network devices;
   send the MSTP configuration to each of the plurality of network devices;
   instruct the plurality of network devices to disable non-MSTP links in response to an acknowledgement from each of the plurality of network devices that the MSTP configuration is received;
   instruct the plurality of network devices to apply the MSTP configuration in response to an acknowledgement from each of the plurality of network devices that the non-MSTP links are disabled; and
   instruct the plurality of network devices to re-enable the non-MSTP links in response to an acknowledgement from each of the plurality of network devices that the MSTP configuration is applied.

9. The medium of claim 8, including instructions executable by the processing resource to instruct each of the plurality of network devices to revert to a previous MSTP configuration in response to not receiving an acknowledgement from at least one of the plurality of network devices that the MSTP configuration is applied.

10. The medium of claim 8, including instructions executable by the processing resource to:
build a revised MSTP configuration in response to at least one of not receiving an acknowledgement from at least one of the plurality of network devices that the MSTP configuration is applied, that the MSTP links are disabled, and that the MSTP configuration is received.

11. The medium of claim 8, wherein the instructions executable by the processing resource to build the MSTP configuration are executed by at least one of a controller of a software-defined network and one of the plurality of network devices assigned as a master reconfiguration network device.

12. A method for multi-instance spanning tree (MSTP) configuration, comprising:
assigning a network device among a plurality of network devices of a software-defined network (SDN) as a master reconfiguration network device (MRD);
receiving, from a controller of the SDN, an MSTP configuration by the MRD;
sending the MSTP configuration to the plurality of network devices;
instructing, using the MRD, the plurality of network devices to:
disable non-MSTP links in response to verification that each of the plurality of network devices receive the MSTP configuration;
apply the MSTP configuration in response to verification that each of the plurality of network devices disabled the non-MSTP links; and
re-enable the non-MSTP links in response to verification that each of the plurality of network devices applied the MSTP configuration and that the MSTP configuration is stable; and
receiving, from the controller, a revised MSTP configuration by the MRD.

13. The method of claim 12, including:
providing, by the controller, the MSTP configuration to a user; and
revising, by the controller, the MSTP configuration in response to user input.

14. The method of claim 12, including configuring, by the controller, the plurality of network devices for auto-MSTP configuration in response to user input.

15. The method of claim 12, including receiving the revised MSTP configuration at a predefined period of time.

* * * * *